(12) United States Patent
Calvanese Strinati et al.

(10) Patent No.: US 9,392,465 B2
(45) Date of Patent: Jul. 12, 2016

(54) LINK ADAPTATION METHOD SUPERVISED BY THE SELECTION OF AN INTERFERENCE REGIME

(71) Applicant: COMMISSARIAT A L'ENERGIE ATOMIQUE ET AUX ENE ALT, Paris (FR)

(72) Inventors: Emilio Calvanese Strinati, Grenoble (FR); Cedric Abgrall, Evian les Bains (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 146 days.

(21) Appl. No.: 14/170,907

(22) Filed: Feb. 3, 2014

(65) Prior Publication Data
US 2014/0219195 A1 Aug. 7, 2014

(30) Foreign Application Priority Data
Feb. 4, 2013 (FR) .................................. 13 50944

(51) Int. Cl.
*H04B 7/216* (2006.01)
*H04W 16/14* (2009.01)
*H04J 11/00* (2006.01)
*H04L 1/00* (2006.01)

(52) U.S. Cl.
CPC ............. *H04W 16/14* (2013.01); *H04J 11/004* (2013.01); *H04J 11/0026* (2013.01); *H04J 11/0053* (2013.01); *H04L 1/0009* (2013.01); *H04J 2211/001* (2013.01)

(58) Field of Classification Search
None
See application file for complete search history.

(56) References Cited

U.S. PATENT DOCUMENTS

| 8,849,210 | B2 * | 9/2014 | Mese et al. ................... 455/63.1 |
| 2003/0214917 | A1 * | 11/2003 | Molisch et al. ............... 370/286 |
| 2006/0210001 | A1 * | 9/2006 | Li et al. ......................... 375/346 |

(Continued)

FOREIGN PATENT DOCUMENTS

| EP | 2 413 511 A1 | 2/2012 |
| EP | 2 549 670 A1 | 1/2013 |

(Continued)

OTHER PUBLICATIONS

French Preliminary Search Report issued Nov. 26, 2013, in French Application No. 13 50944 filed Feb. 4, 2013 (with English Translation of Categories of Cited Documents), 2 pgs.
Cedric Abgrall, et al, "Centralized Power Allocation for Interference Limited Networks", Vehicular Technology Conference Fall (VTC 2010-Fall), 2010 IEEE $72^{nd}$, Sep. 6, 2010, 5 pgs.

(Continued)

*Primary Examiner* — Kwang B Yao
*Assistant Examiner* — Juvena Loo
(74) *Attorney, Agent, or Firm* — Oblon, McClelland, Maier & Neustadt, L.L.P.

(57) ABSTRACT

The invention relates to a link adaptation method for a cellular or heterogeneous wireless telecommunications system. The communications of the system are organized in pairs of interfering communications. For a first communication between a first transmitting terminal and a first receiving terminal interfering with a second communication between a second transmitting terminal and a second receiving terminal, the first and/or second link(s) are adapted, at a constant transmission power, by selecting a weak or strong interference regime for the first and/or second link(s), the weak regime corresponding to processing of the interference as thermal noise, the strong regime corresponding to processing in which the interfering communication is decoded in order to be eliminated from the received signal.

8 Claims, 10 Drawing Sheets

(56) References Cited

U.S. PATENT DOCUMENTS

| | | | |
|---|---|---|---|
| 2010/0234071 A1* | 9/2010 | Shabtay et al. | 455/562.1 |
| 2011/0164576 A1* | 7/2011 | Vermani et al. | 370/329 |
| 2012/0275327 A1* | 11/2012 | Zangi et al. | 370/252 |
| 2013/0058288 A1* | 3/2013 | Nentwig | 370/329 |
| 2013/0196700 A1* | 8/2013 | Tiirola et al. | 455/501 |
| 2014/0220994 A1 | 8/2014 | Calvanese Strinati et al. | |

FOREIGN PATENT DOCUMENTS

| | | | |
|---|---|---|---|
| FR | 2 963 193 A1 | 1/2012 |
| FR | 2 963 194 A1 | 1/2012 |
| FR | 2 963 195 A1 | 1/2012 |

OTHER PUBLICATIONS

European Search Report issued May 5, 2014 in European Patent Application No. 14 15 3658 with English Translation of Category of Cited Documents.

Raul H. Etkin, et al., "Gaussian Interference Channel Capacity to Within One Bit", IEEE Transactions on Information Theory, vol. 54, No. 12, (Dec. 2008), pp. 5334-5562.

Karsten Brueninghaus, et al., "Link Performance Models for System Level Simulations of Broadband Radio Access Systems", IEEE 16th International Symposium on Personal, Indoor and Mobile Radio Communications, (2005), pp. 2306-2311.

Niko Kolehmainen, et al., "Channel Quality Indication Reporting Schemes for UTRAN Long Term Evolution Downlink", IEEE ITC Spring 2008, pp. 2522-2526.

* cited by examiner

LINK ADAPTATION METHOD SUPERVISED BY THE SELECTION OF AN INTERFERENCE REGIME

TECHNICAL FIELD

The present invention generally relates to the field of wireless telecommunications systems and more particularly a link adaptation method in such a system. It is particularly applicable in heterogeneous telecommunications systems.

BACKGROUND OF THE INVENTION

One of the problems affecting communication within a cellular telecommunications system is that of the interference generated by other communications of the cell or neighboring cells. A distinction is traditionally made between intercellular interference due to communication from neighboring cells and intra-cellular interference due to communications by the same cell where the terminal is located.

Many techniques have been proposed and implemented to reduce intra-cellular interference. Most of these techniques are based on an allocation of orthogonal transmission resources, for example time transmission intervals (TDMA), frequency transmission intervals (FDMA), OFDM orthogonal frequency-division multiplexing intervals (OFDMA), transmission codes (CDMA), transmission bundles (SDMA), or even a combination of such resources, so as to separate the different communications of a same cell.

Transmission resources being rare, they are generally reused, at least in part, from one cell to the next. A radio resource management (RRM) module is then responsible for statically or dynamically allocating the radio resources to the different cells. It is in particular known to statically reuse radio frequencies following a bi-dimensional pattern (Frequency Reuse Pattern).

This transmission resource management is, however, somewhat ineffective in high-density networks, heterogeneous networks or M2M (machine to machine) networks. A heterogeneous network refers to the superposition of a first cellular network with a low spatial granularity with at least one second cellular network with a high spatial granularity (made up of femtocells or picocells). The first cellular network is then called macrocellular, as opposed to the second network.

The allocation of orthogonal resources in the aforementioned networks would in fact result in an insufficient use of those resources, and at a low spectral efficiency. As a result, communications relative to users belonging to neighboring cells, or cells with different hierarchical levels in a heterogeneous network, generally experience in-band interference.

For a given communication, here called first communication, the interference caused by a second communication using the same transmission resource as the first is commonly called intra-band interference. In contrast, the interference caused by a second communication using a separate transmission resource (for example, a neighboring transmission frequency or another transmission interval) from that used by the first is called inter-band interference.

A network in which inter-band interference is predominant relative to the thermal noise is called "interference limited network" inasmuch as the capacities of different links of the network are more constrained by the interference than by the noise itself.

The treatment and production of inter-band interference have been the subject of considerable research.

The simplest processing method is to consider the interference as a simple thermal noise. This processing method is only acceptable, however, if the interference level is low. It should be noted that most power allocation algorithms are based on this hypothesis.

Other processing methods make it possible to reduce the interference by estimating the information signal of the interfering communication(s). This assumes that the considered receiving terminal knows the codes having been used to encode them. Known amongst these methods are in particular PIC (Parallel Interference Canceller) or serial (Successive Interference Canceller) interference reduction schemes, well known by those skilled in the art.

Another traditional approach for reducing the interference level is to implement an adaptive power control method. Such a method makes it possible to monitor the power levels of the different transmitting terminals so as to guarantee a predetermined service quality to the different users. This service quality can be measured depending on the case in terms of rate, latency, packet error rates, spatial coverage, etc. Traditionally, service quality metric refers to the parameter(s) used to measure it. As a general rule, a user's communication requires a minimum service quality that is taken into account or negotiated during the procedure to admit the user into the cell. This minimum service quality is expressed in the form of a stress on the service quality metric: latency below a threshold, rate greater than a guaranteed minimum, etc. The power allocation is then done so as to comply with the constraint on the service quality metric.

The power allocation methods generally adopt the hypothesis that the interference is comparable to thermal noise. However, this hypothesis is quite often pessimistic, such that the allocated transmission powers may be substantially greater than those necessary to obtain the desired quality of service. This allocation consequently leads to needless energy consumption and, for upstream communications, a reduction in the autonomy of the terminals.

Applications FR-A-2,963,194 and FR-A-2,963,195 recently proposed a centralized or distributed power allocation method, with a constraint on the service quality. More specifically, for a given constraint on the service quality, this power allocation method makes it possible to reduce the transmission powers of the terminals taking certain interference regimes affecting the different communications into account. Thus, according to this method, if a first communication is considered between a first transmitting terminal and a first receiving terminal, interfered with by a second communication between a second transmitting terminal and a second receiving terminal, three possible interference regimes exist for the first communication: a first regime with a high SINR (signal-to-noise and interference ratio), in which the first receiver processes the signal of the second communication as thermal noise, a second regime with a moderate SINR, in which the first receiver jointly decodes the information signals from the first and second communications, and lastly a third regime with a low SINR, in which the first receiver first decodes the information signal of the second communication, subtracts its contribution to the received signal before decoding the information signal of the second communication from the signal thus obtained.

This power allocation method works well for a pair of interfering communications. However, for a larger number of interfering communications, the situation becomes substantially more complex. It is in fact understood that a power allocation to a given transmitter affects the interference regime of the other communications and may modify their respective interference regimes. Thus, the power modification of one transmitter may lead to a power modification of one or several other transmitters. The power allocation may become unstable and diverge until reaching a situation where all of the concerned transmitters transmit at maximum power.

The aim of the present invention is to propose a link optimization method in a wireless telecommunications network, without modifying the power allocation of the different transmitters and therefore without any significant disruption of the interference situation between the different communications.

DESCRIPTION OF THE INVENTION

The present invention is defined by a link adaptation method for a wireless telecommunications system comprising at least one first pair of terminals formed by a first transmitting terminal and a first receiving terminal and a second pair of terminals formed by a second transmitting terminal and a second receiving terminal, a first communication on a first link between the terminals of the first pair using the same transmission resources as a second communication on a second link between the terminals of the second pair, such that the two communications interfere with each other. According to this method:

a first interference regime is selected for the first communication from among a weak regime, in which the first receiving terminal processes the interference due to the second communication as thermal noise, and a strong regime, in which it decodes the information signal of the second communication to subtract its contribution to the received signal therefrom;

a modulation and coding scheme is determined for the second link allowing the first communication to operate in the interference regime thus selected;

a modulation and coding scheme is determined for the first link maximizing the spectral efficiency without that link being in an outage situation.

According to a first alternative, the interference regime is selected as a function of a charge level of the battery of the first receiving terminal, the weak regime being selected when that level is below a first threshold and the strong regime being selected when that level is above a second threshold.

According to a second alternative, the interference regime is selected as a function of the computation resources of the first receiving terminal, the weak regime being selected when those resources are below a first threshold and the strong regime being selected when those resources are above a second threshold.

According to a third alternative, the interference regime is selected as a function of the power of the interference received by the first receiving terminal, the weak regime being selected when that power is below a first threshold and the strong regime being selected when that power is above a second threshold.

Advantageously, a second interference regime is also selected for the second communication, from among a weak regime, in which the second receiving terminal processes the interference due to the first communication as thermal noise, and a strong regime, in which it decodes the information signal of the first communication to subtract its contribution to the received signal therefrom;

a modulation and coding scheme is determined for the first link allowing the first communication to operate in the interference regime thus selected.

The modulation and coding schemes may be determined jointly for the first and second links, such that the first and second communications respectively operate in the interference regimes selected for the first and second communications, said modulation regimes further being selected to have a maximal spectral efficiency without the first and second links being in an outage situation.

Advantageously, the quality of each link is measured using a signal-to-noise and interference ratio or using an effective SINR exponential metric, and a quality index of said link is deduced therefrom.

In order to guarantee that a link is not in an outage situation, the modulation and coding scheme may be chosen to be below the quality index of the link.

According to a first embodiment, the determination of the modulation and encoding regime for the first, second link, respectively, is done in a centralized manner by a control node, said control node indicating the regime thus determined to the first, second transmitting terminal, respectively.

According to a second embodiment, the determination of the modulation and encoding regime for the first, second link, respectively, is done by the first, second receiving terminal, respectively, the latter transmitting the regime thus determined to the first, second transmitting terminal, respectively.

BRIEF DESCRIPTION OF THE DRAWINGS

Other features and advantages of the invention will appear upon reading the preferred embodiments of the invention given below in reference to the appended figures, in which.

DETAILED DESCRIPTION OF THE INVENTION

We hereinafter consider a wireless communication system comprising multiple pairs of transmitting terminals and receiving terminals and will assume that a communication between the terminals of one pair may interfere with a communication between the terminals of another pair, for example because those two communications are using shared transmission resources (intra-band interference).

The wireless communication system may for example be a cellular communication network, an ad hoc communication network, a heterogeneous network comprising a macrocellular level and a femtocellular level.

In a heterogeneous network, the considered communications may be at two different levels, for example one at the macrocellular level and the other at the femtocellular level.

Each of the communications may either be uplink or downlink, the expression "transmitting terminal" or "receiving terminal" being considered in its broad sense and in particular including a base station or an access point of the network.

Figure 2:
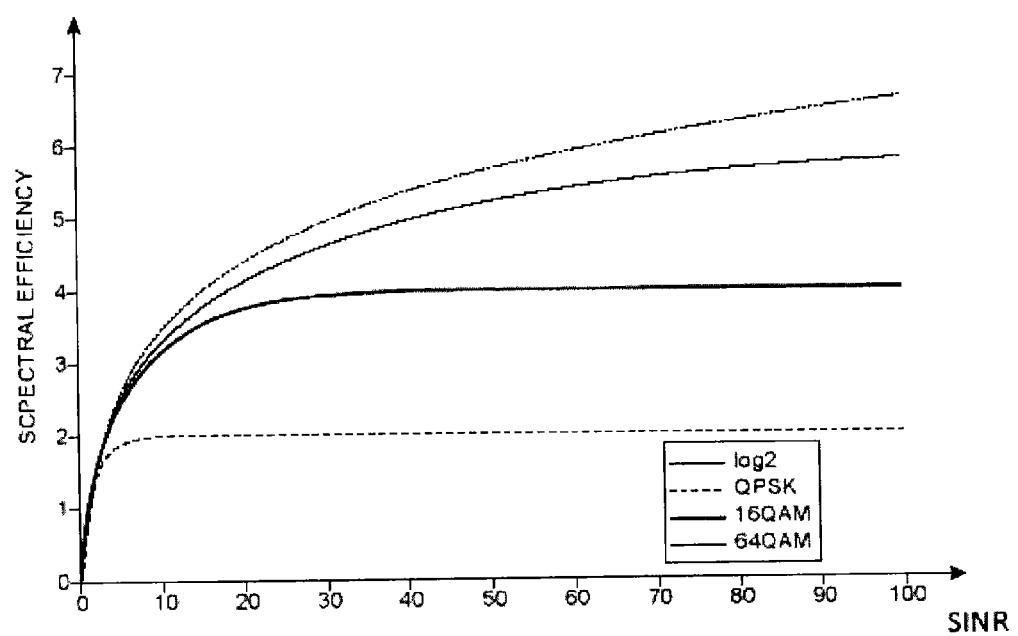
FIG. 2 shows the spectral efficiency as a function of the signal-to-noise plus interference ratio on a link, for different modulation regimes.

To simplify the presentation, we will first consider the case of a system only having two pairs of terminals, as illustrated in FIG. 2.

If $x_1$, $x_2$ respectively denote the signals sent by the transmitting terminals 110 and 130 and $y_1$, $y^2$ denote the signals respectively received by the receiving terminals 120 and 140, we have:

$$y_1 = g_{11}x_1 + g_{12}x_2 + z_1$$

$$y_2 = g_{21}x_1 + g_{22}x_2 + z_2 \quad (1)$$

where $z_1, z_2$ are Gaussian white noise samples $g_{11}, g_{21}$ are the channel coefficients between the transmitting terminal 110 and the receiving terminals 120 and 140, respectively, and $g_{22}, g_{12}$ are the channel coefficients between the transmitting terminal 130 and the receiving terminals 140 and 120, respectively.

It will be understood that the interference between communications is represented in (1) by the crossed terms.

For the first communication, between the first transmitter and receiver, the respective powers of the information and interference signal due to the second communication are respectively $|g_{11}|^2 P_1$ and $|g_{12}|^2 P_2$.

Similarly, for the second communication between the second transmitter and receiver, the respective powers of the information signal and the interference due to the first communication are respectively $|g_{22}|^2 P_2$ and $|g_{21}|^2 P_1$.

The signal to noise ratio (SNR) at the first receiver can be expressed in the form:

$$\gamma_1 = |g_{11}|^2 \frac{P_1}{N_0} \quad (2)$$

Similarly, the interference to noise ratio at the first receiver is none other than:

$$\delta_1 = |g_{12}|^2 \frac{P_2}{N_0} \quad (3)$$

Likewise, the signal to noise and interference to noise ratios at the second receiving terminal can respectively be written as:

$$\gamma_2 = |g_{22}|^2 \frac{P_2}{N_0} \quad (4)$$

$$\delta_2 = |g_{21}|^2 \frac{P_1}{N_0} \quad (5)$$

It will be noted that the following relationships are verified:

$$\delta_1 = f_2 \gamma_2 \quad (6)$$

and $$\delta_2 = f_1 \gamma_1$$

where $$f_1 = \frac{|g_{21}|^2}{|g_{11}|^2}$$

and $$f_2 = \frac{|g_{12}|^2}{|g_{22}|^2}.$$

Hereinafter $\rho_1$ and $\rho_2$ will denote the respective rates on the first and second communications.

The rates $\rho_1$ and $\rho_2$ on the first communication and the second communication are expressed as:

$$\rho_1 = v_1 B \text{ and } \rho_2 = v_2 B \quad (7)$$

where $v_1$ and $v_2$ are respectively the spectral efficiency of the first link and the spectral efficiency of the second link, expressed in bits/s/Hz for the first communication, and where B is the bandwidth of the shared transmission resource.

The spectral efficiency v of a link depends on the modulation and coding scheme (MCS) used on that link. In general, the spectral efficiency is proportional to the coding rate and the modulation order chosen for the transmission on the link in question.

It is known that for a given signal-to-noise plus interference ratio (SINR) on a link, it is possible to obtain a good quality of service (QoS), for example in terms of binary error rate (BER) or packet error rate (PER), by using a MCS with a low spectral efficiency and therefore a low coding level, or a lower quality of service, by using a MCS with a high spectral efficiency and therefore a higher rate. In general, the choice of the MCS is a compromise between spectral efficiency and robustness of the link.

FIG. 2 shows the spectral efficiency gain relative to a binary modulation (BPSK) as a function of the signal-to-noise plus interference ratio, for different modulation regimes (QPSK, 16-QAM and 64-QAM). It will be noted that for a given SINR level, the spectral efficiency that may be expected depends on the order of the modulation.

The idea at the basis of the invention is not to combat interference by modifying the power allocation of different transmitters, with the aforementioned instability problems, but on the contrary to take advantage of it by distinguishing two interference regimes: a first regime, called weak regime, in which the interference is low enough to be processed as thermal noise, and a second regime, called strong regime, in which the interference is strong enough to be able to be decoded and eliminated from the received signal.

This partitioning of the interference diagram into two regimes must be distinguished from the five-regime partitioning introduced in the article by R. H. Etkin et al. entitled "Gaussian interference channel capacity to within one bit", published in IEEE Trans. on Information Theory, Vol. 54, No. 12, December 2008, pp. 5534-55-62 and the three-regime partitioning proposed in the application and FR-A-2,963,193. In the present case, only the two extreme regimes are taken into account.

More specifically, the strong regime here is characterized by the fact that the interference is strong enough to first decode the information signal relative to the second communication, estimate the contribution due to that communication in the received signal and subtract it from the latter. The information signal of the first communication is then decoded from the resulting signal, rid of the interference. It will be understood that the processing of the interference done in that regime is a SIC (signal interference cancellation) processing.

For the first receiver to be able to decode the information signal relative to the second communication, this assumes that the crossed channel is not in an outage situation, in other words that its capacity can support the rate $\rho_1$:

$$v_2 \leq \log_2(1 + SNR_{12}) = \log_2\left(1 + \frac{\delta_1}{1 + \gamma_1}\right) \quad (8)$$

where $SINR_{12}$ is the "signal-to-noise" ratio at the receiving terminal 120 in which the signal here is understood to be the information signal of the second communication.

It is deduced from (8) that the strong regime is defined by:

$$f_2\gamma_2 \geq A_2(1+\gamma_1) \quad (9)$$

with $A_2 = 2^{v_2} - 1$. By default, if the inequality (9) is not verified, the system is in the weak regime.

The constraints to establish a first communication are different depending on whether the interference regime is weak or strong:

In the weak interference regime, it is necessary for the signal-to-noise plus interference ratio on the direct channel (between the first transmitter 110 and the first receiver 120) to make it possible to pass the rate $\rho_1$ of the first communication, in other words:

$$v_1 \leq \log_2(1 + SNR_{11}) = \log_2\left(1 + \frac{\gamma_1}{1 + \delta_1}\right) \quad (10)$$

where $SINR_{11}$ is the signal-to-noise plus interference ratio at the first receiving terminal.

It is possible to deduce, from (10), a first constraint on $\gamma_1$, relative to the first communication in the weak regime, i.e.:

$$\gamma_1 \geq A_1(1+f_2\gamma_2)$$

with $A_1 = 2^{v_1} - 1$.

In the strong regime, once the interference due to the second communication is subtracted from the received signal, one is once again in the case of a signal simply made noisy by a thermal noise, in other words it is necessary for:

$$v_1 \leq \log_2(1+SNR_{11}) = \log_2(1+\gamma_1) \quad (12)$$

where $SNR_{11}$ is the signal-to-noise ratio after elimination of the interference due to the second communication.

One deduces, from (12), a second constraint on $\gamma_1$ relative to the first communication in the strong regime, i.e.:

$$\gamma_1 \geq A_1 \quad (13)$$

Figure 1:
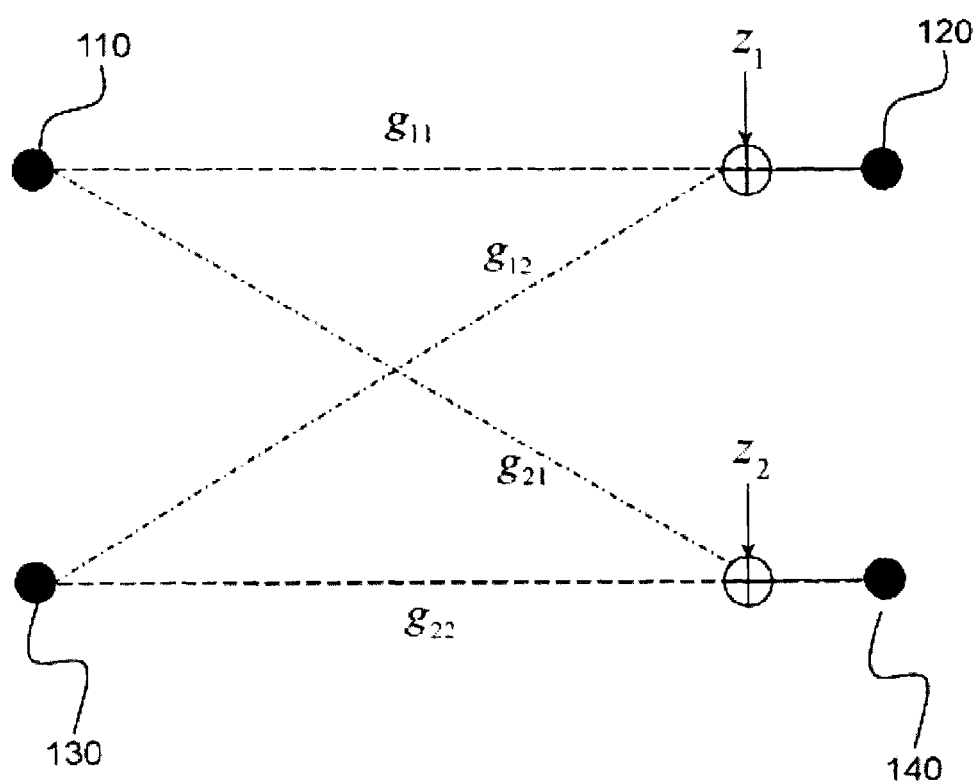
FIG. 1 diagrammatically shows two interfering communications between a first transmitter-receiver pair and a second transmitter-receiver pair.
Figure 3:
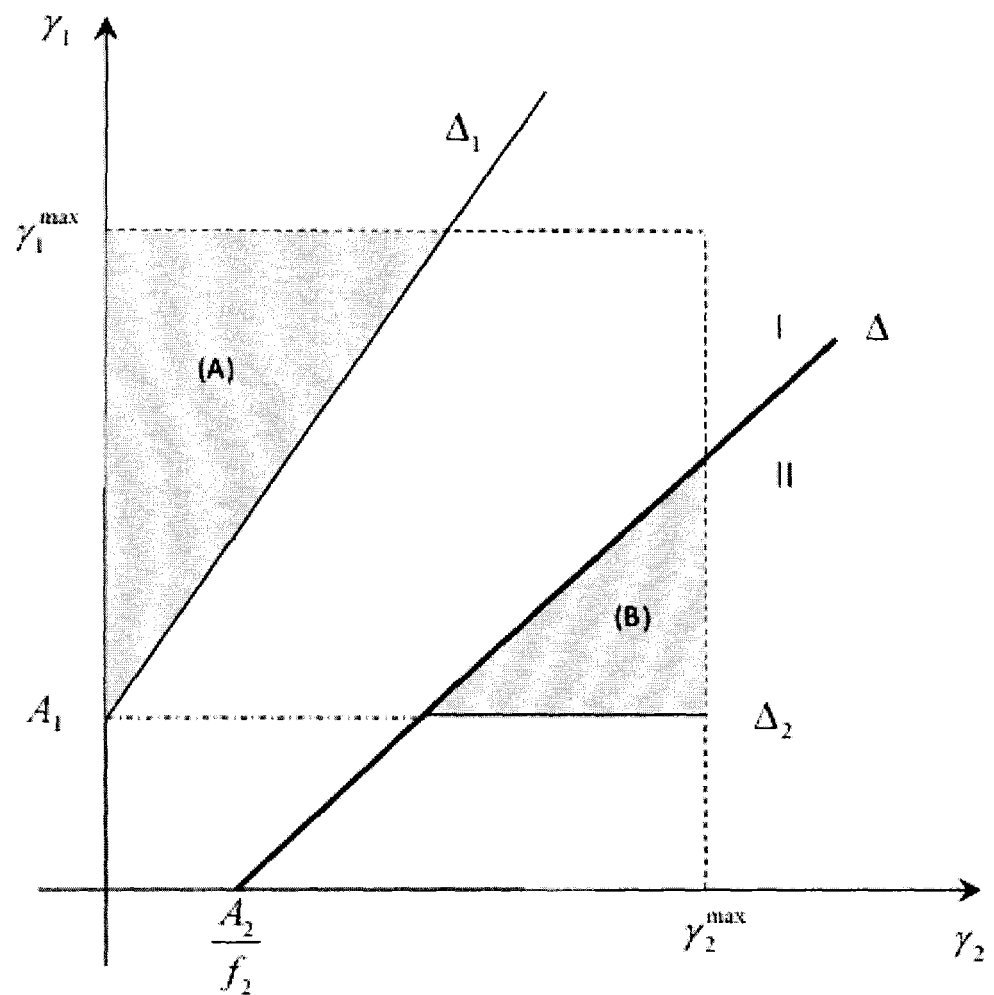
FIG. 3 shows an interference diagram between the two communications of FIG. 1 showing two separate regimes.

FIG. 3 shows the interference diagram between the two communications of FIG. 1.

The maximum powers of the first and second transmitters have been respectively denoted $\gamma_1^{max}$ and $\gamma_2^{max}$.

The border delimiting the strong and weak interference regimes is given by the straight line $\Delta$ (shown in a thick line), with equation $$\gamma_1 = \frac{f_2}{A_2}\gamma_2 - 1.$$

In fact, once the operating point $(\gamma^*_2, \gamma^*_1)$ is situated below the straight line (regime II), the crossed channel is not in an outage situation and the interference may be used, in other words the signal of the second communication may be decoded and its contribution to the signal received by the first receiver may be eliminated. However, when the crossed channel is in an outage situation, it is no longer possible to perform prior decoding of the interference, and the latter is then processed as thermal noise (regime I).

The straight line $\Delta_1$, with equation $\gamma_1 = A_1(1+f_2\gamma_2)$, and the straight line $\Delta_2$, with equation $\gamma_1 = A_1$, delimit the outage situation of the direct channel, in the weak and strong regimes, respectively. As a result, in the weak regime, only the zone (A) situated above the straight line $\Delta_1$ will be usable, and in the strong regime, only the zone (B) situated above the straight line $\Delta_2$ will be usable. In other words, if the operating point $(\gamma^*_2, \gamma^*_1)$ is located outside the zones (A) and (B), it will not be possible to decode the information signal of the first communication.

When the spectral efficiency $v_2$ of the second link varies, the slope $$\frac{f_2}{A_2}$$

and the intercept point of the straight line $\Delta_2$ vary. As a result, the modification of the MCS of the second link modifies the partitioning of the diagram between two interference regimes.

Figure 4A:
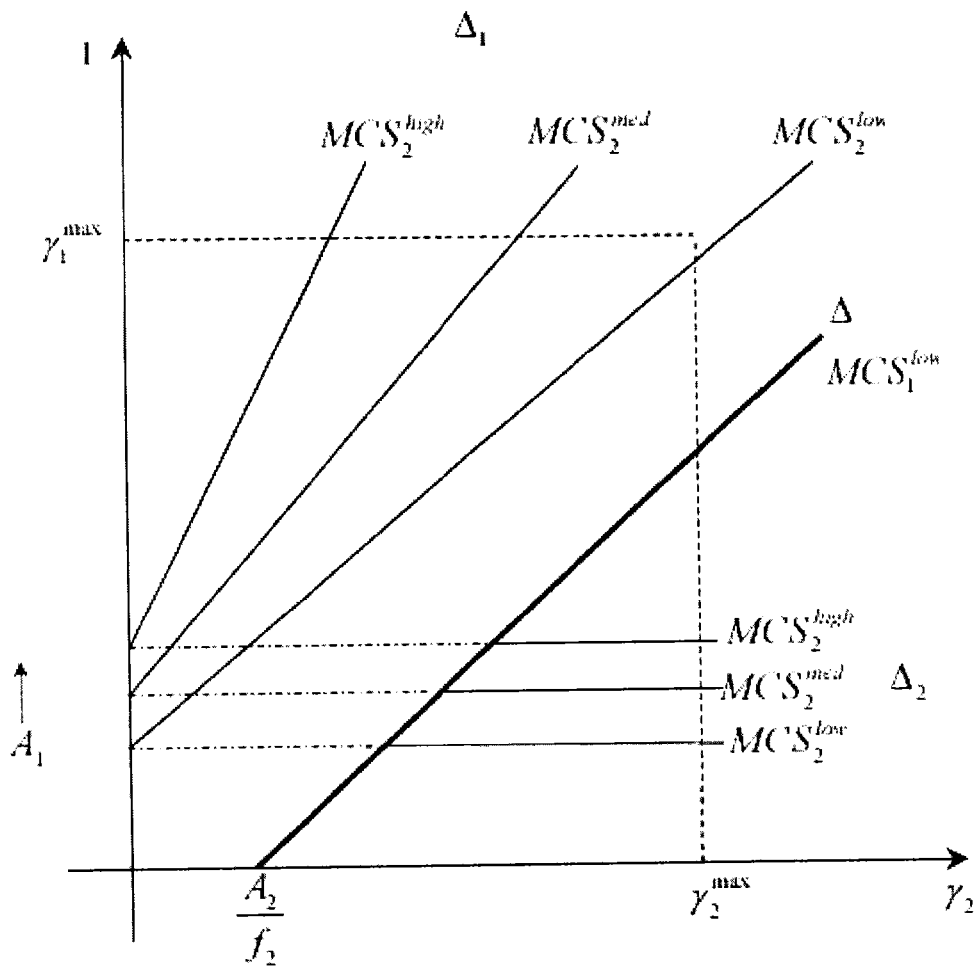
FIGS. 4A to 4C show the evolution of the partitioning of the interference diagram for different modulation and encoding regimes used for the first and second communications.
Figure 4B:
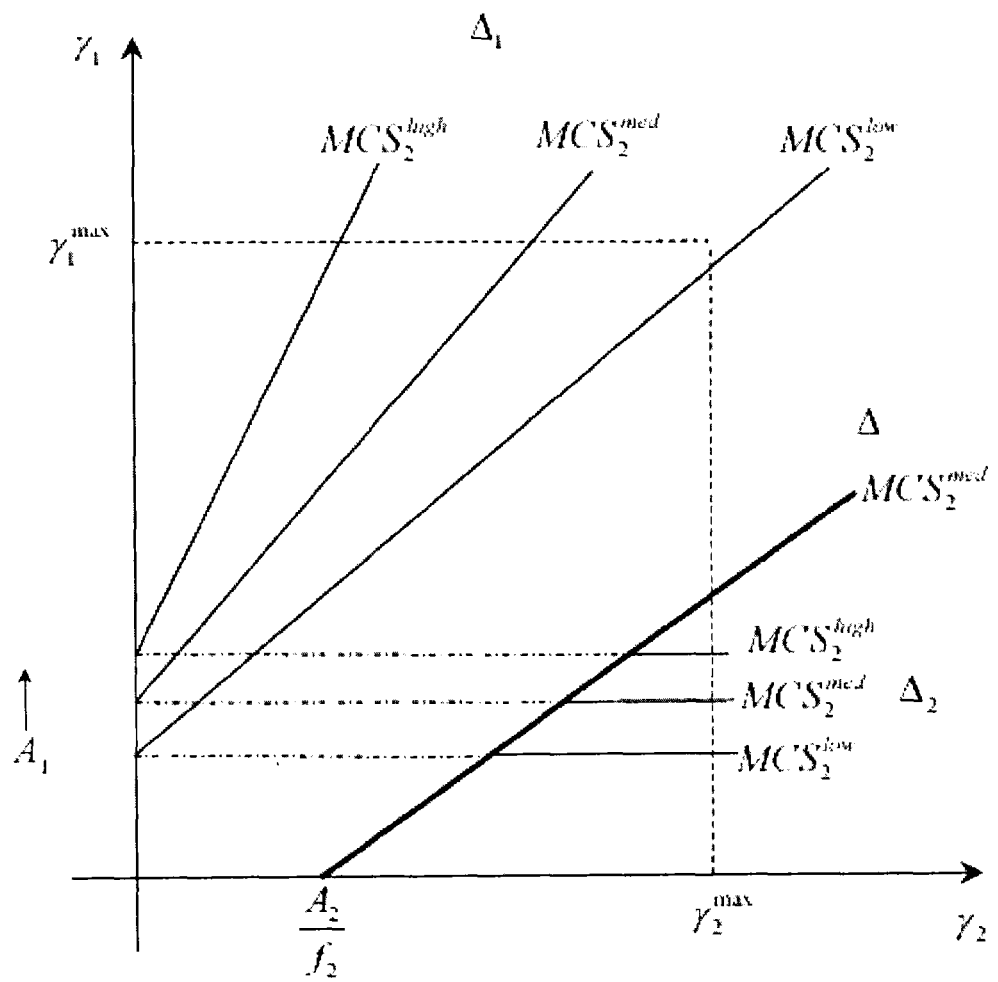
Figure 4C:
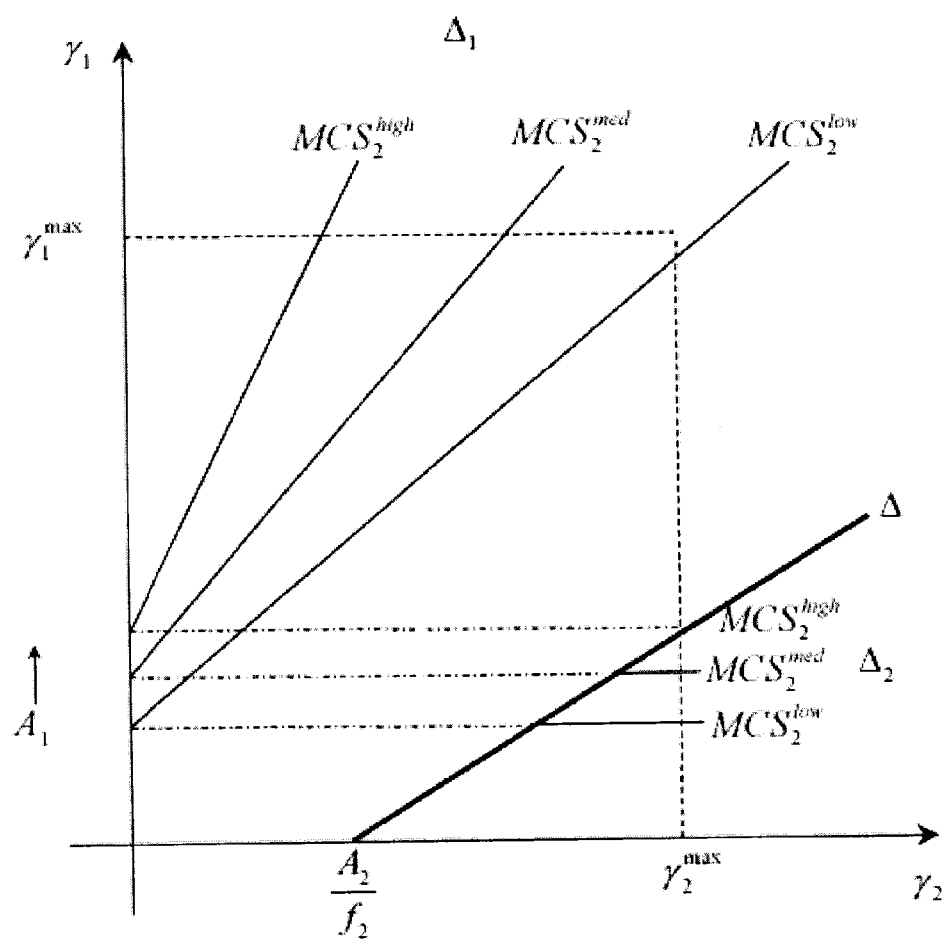

FIGS. 4A to 4C illustrate the evolution of this partitioning for different MCSs of the second link, denoted $MCS_2^{low}$, $MCS_2^{med}$ and $MCS_2^{high}$, having low, medium and high spectral efficiencies, respectively.

It will be noted that the higher the spectral efficiency of the second link $v_2$ is, the more zone II is offset toward the high signal-to-noise ratio values $\gamma_2$.

Furthermore, when the spectral efficiency $v_1$ of the first link varies, the slope $A_1f_2$ and the intercept point $A_1$ of the straight line $\Delta_1$ vary, as the intercept point of the straight line $\Delta_2$ varies.

For each of FIGS. 4A to 4C, the straight lines $\Delta_1, \Delta_2$ have been shown for different MCSs of the first link, denoted $MCS_1^{low}$, $MCS_1^{med}$ and $MCS_1^{high}$, having low, medium and high spectral efficiencies, respectively.

It will be understood that the higher the spectral efficiency $v_1$ of the first link is, the more the operating zones (A) and (B) are offset toward the highest signal-to-noise ratio values $\gamma_1$.

Figure 5:
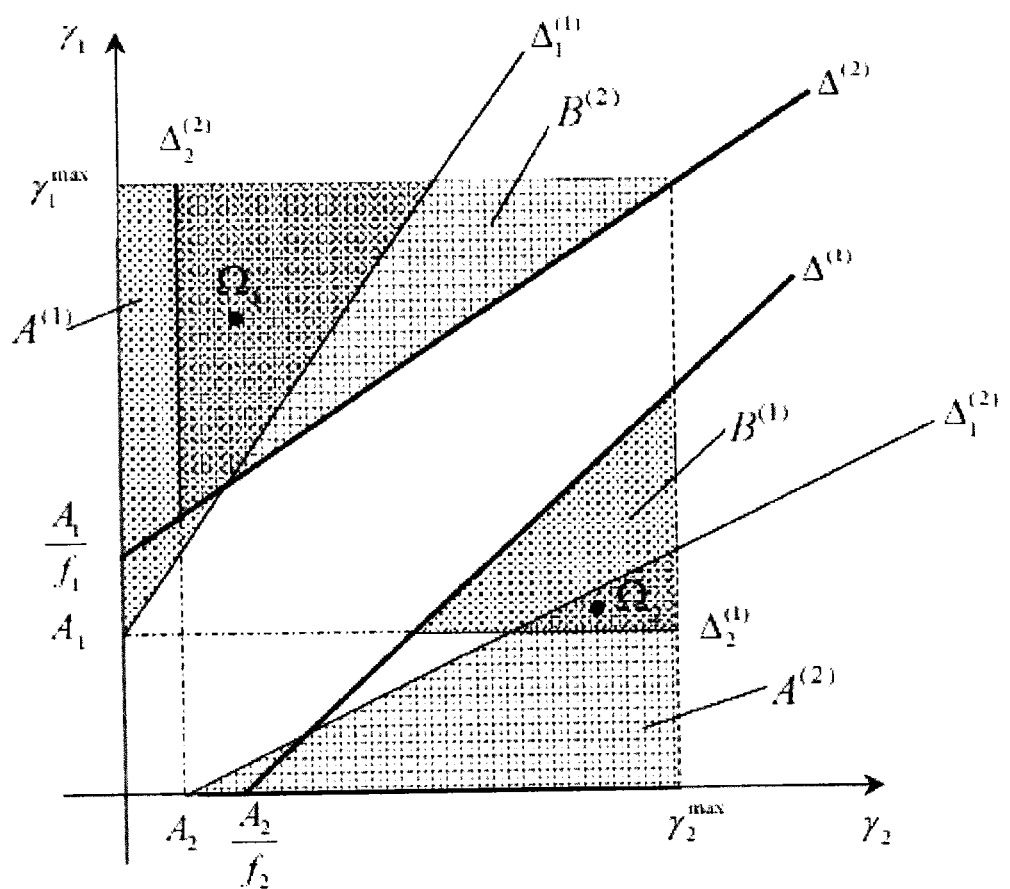
FIG. 5 shows an interference diagram partition for the first and second communications.

FIG. 5 provides an interference diagram in which both the interference regimes for the first communication and the interference regimes for the second communication are shown.

The operating zones relative to the first communication have been denoted $A^{(1)}$ and $B^{(1)}$ for the weak and strong regimes, respectively, and likewise, those relative to the second communication have been denoted $A^{(2)}$ and $B^{(2)}$ for the weak and strong regimes, respectively.

In most cases, for a given pair of powers $P^*_1, P^*_2$ and therefore a given pair of signal-to-noise ratio values $\gamma^*_1$ and $\gamma^*_2$, t s possible to choose $MCS_1$ (for the first link) and $MCS_2$ (second link) schemes, such that the operating point $\Omega$ with coordinates $(\gamma^*_2, \gamma^*_1)$ is situated in the intersection $A^{(1)} \cap B^{(2)}$ or $A^{(2)} \cap B^{(1)}$, as shown by points $\Omega_1$ and $\Omega_2$, respectively. Point $\Omega_1$ corresponds to interference processing as simple thermal noise for the first communication and by SIC for the second communication. Conversely, point $\Omega_2$ corresponds to interference processing as simple thermal noise for the second communication and by SIC for the first communication.

In certain cases, in particular when $f_1f_2 > A_1A_2$, it will be possible to choose $MCS_1$ and $MCS_2$ schemes such that the operating point $\Omega$ is situated in the intersection $B^{(1)} \cap B^{(2)}$. This corresponds to the particular situation where the crossed channels are of significantly better quality than the direct channels.

Lastly, the case where the interference between the two communications is low results in straight partitioning lines $\Delta^{(1)}$ and $\Delta^{(2)}$ outside the power rectangle $[0,\gamma_2^{max}] \times [0,\gamma_1^{max}]$, in other words zones $B^{(1)}$ and $B^{(2)}$ reduced to the empty set. The operating point belongs to the zone $A^{(1)} \cap A^{(2)}$ and the processing of the interference is that of a thermal noise for both communications.

The link adaptation method described below applies to a wireless telecommunications system comprising multiple pairs of transmitting and receiving terminals. One first determines, for each first communication between a first transmitting terminal and a first receiving terminal, the second communication generating the strongest interference with the first communication, the interference due to the other communications then being likened to thermal noise.

Figure 6:
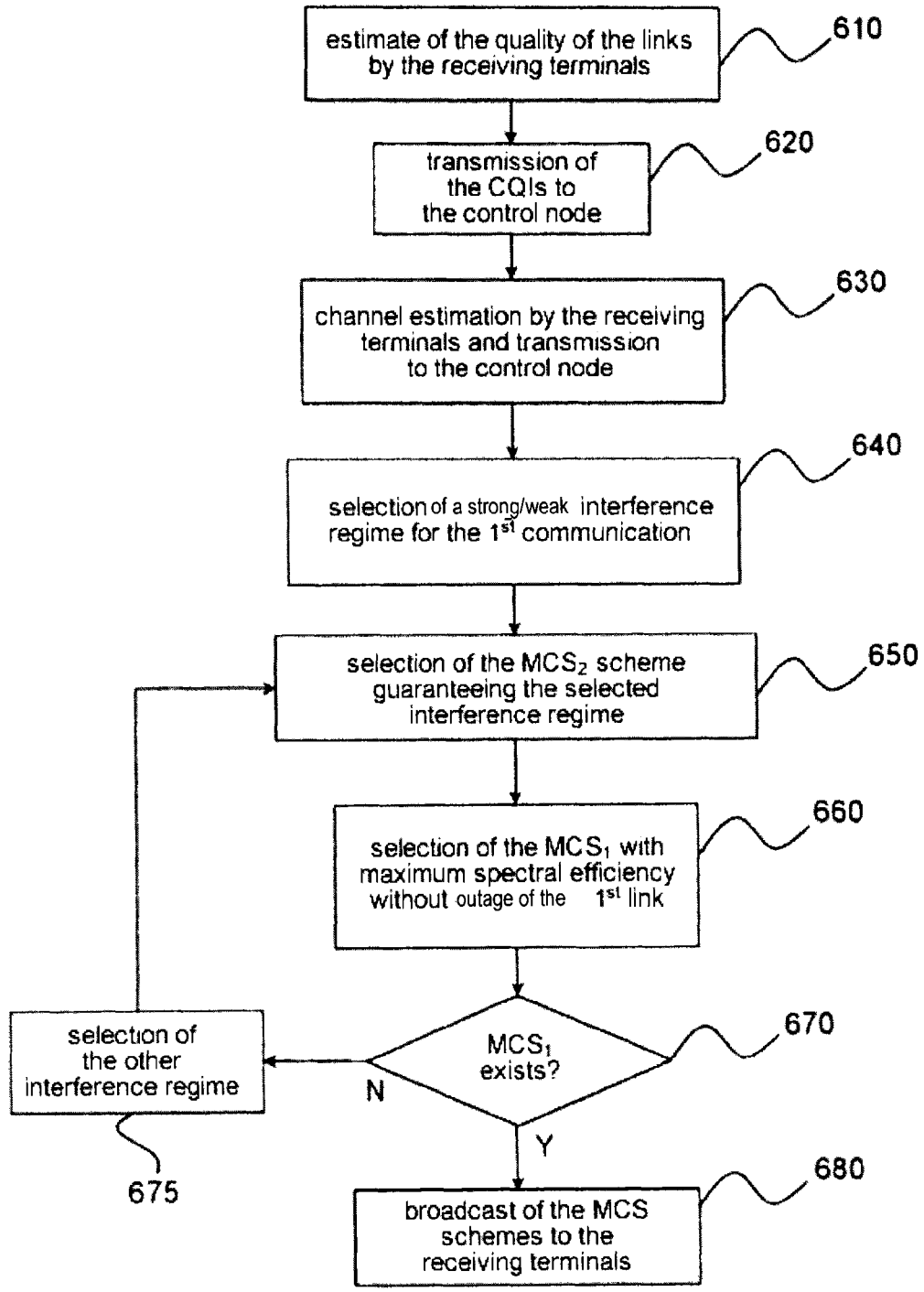
FIG. 6 diagrammatically shows a link adaptation method according to a first embodiment of the invention, of the centralized type.

FIG. 6 diagrammatically shows a link adaptation method according to a first embodiment of the invention. In that first embodiment, the link adaptation is done in a centralized manner in a control node, which may be a node of the network (user terminal, base station, ad hoc node).

In the first step 610, for each link between the transmitting terminal and receiving terminal, the latter estimates the quality of said link. Different metrics may be used to that end. For example, the link quality may be estimated in terms of signal-to-noise plus interference ratio (SINR) or using an effective SINR exponential metric, called exp-ESM, more suitable for non-ergodic channels, as described in the article by K. Brueninghaus entitled "Link performance models for system level simulation of broadband radio access systems", published in Proc. of IEEE 16th Int'l Symposium on PIRMC, 2005, pp. 2306-2311. The SINR or exp-ESM ratio may be measured in a manner known in itself using the pilot sequence sent by the transmitting terminal over said link.

In step 620, each receiving terminal sends the control node an indicator of the quality of the link estimated in the previous step. This indicator, or CQI (Channel Quality Indicator), is generally obtained using a lookup table associating each SINR level (in dB) with a CQI index with a given pitch (approximately 2 dB). Each CQI index is further associated with a MCS (and therefore a given spectral efficiency). The higher the CQI index is, the better the link is and therefore the higher the modulation order of the MCS can be (resulting in a higher spectral efficiency).

In practice, a CQI index is sent for each communication resource (for example "chunk" of an OFDM multiplex). Different formats may be considered to send the control node the CQI indices in a condensed manner. It is in particular possible to use the so-called Top-M format as described in the article by Kolehmainen et al. entitled "Channel quality indication reporting schemes for UTRAN Long Term Evolution Downlink", published in IEEE ITC Spring 2008, pp. 2522-2526.

The CQI index may be sent with a predetermined frequency to account for the evolution of the quality of the links over time.

In step 630, each receiving terminal performs a channel estimate to estimate the coefficients of the direct channel and the crossed channel. More specifically, when a first communication is interfered with by a second communication, the first receiver determines the channel coefficients $g_{11}$ and $g_{12}$ and the second receiver determines the channel coefficients $g_{22}$ and $g_{21}$. These channel coefficients are sent to the control node.

In step 640, the control node has the set of CQI indices of the different links, in other words, a map of the quality of the links of the system.

For each communication, called first communication, between a first transmitting terminal and a first receiving terminal, interfered with by a second communication between a second transmitting terminal and a second receiving terminal, the control node selects an interference regime from among two possible regimes: a weak regime, in which the interference is processed as thermal noise, and a strong regime, where the information signal of the second communication is decoded before subtracting its contribution from the signal received by the first receiving terminal.

The selection of this interference regime may be made based on different criteria.

For example, the weak regime may be chosen when the first receiver has limited computation resources (UE, i.e., user equipment) or its battery has a charge below a threshold or when the SINR ratio is above a first predetermined threshold.

However, the strong regime may be chosen when the first receiver has considerable computation resources (base station, access point), its battery has a charge above a threshold or the interference power $\delta_1 = f_2 \gamma_2$ is above a second predetermined threshold. The thresholds relative to the charge and the interference power in the strong regime may be different from those relative to the weak regime, so as to guarantee a transition hysteresis between the two interference regimes.

Other criteria may be selected without going outside the scope of the present invention.

In step 650, one chooses, from the CQI index of the second link, a $MCS_2$ scheme for the second communication (i.e., the partitioning straight line $\Delta$ in FIG. 3) compatible with the interference regime selected in the previous step. In other words, the $MCS_2$ scheme is chosen such that the operating point $\Omega$ is situated above the partitioning straight line if the weak regime has been selected and below that straight line if the strong regime has been selected. The $MCS_2$ scheme thus chosen must also correspond to a CQI index below or equal to the CQI index of the second link, such that it is not in an outage situation.

It will be noted that a given $MCS_2$ scheme is associated with a spectral efficiency $v_2$ and therefore a rate $\rho_2 = v_2 B$ determining the value of the variable $A_2$. Furthermore, the coefficient $f_2$ is computed from the coefficients $g_{12}$ and $g_{22}$ and it is therefore possible to determine the partitioning straight line for each $MCS_2$ scheme.

All other things being equal, it will be understood that the more robust the $MCS_2$ scheme is, i.e., the lower its spectral efficiency is, the more the point of intersection of the partitioning straight lines close to 0 and the higher its slope is. The strong regime will then be favored.

Conversely, the higher the spectral efficiency of the $MCS_2$ scheme is, the higher the point of intersection of the partitioning straight line will be and the lower its slope will be. The weak regime will then be favored.

It will be understood that the $MCS_2$ regime thus chosen is generally not that maximizing spectral efficiency, as in the state-of-the-art.

In step 660, the $MCS_1$ scheme is determined maximizing the spectral efficiency on the first link, in light of the interference regime selected in the previous step.

If the weak regime has been selected, this amounts to determining, in the diagram of FIG. 3, the straight line $\Delta_1$ with the steepest slope, such that the operating point $\Omega$ is situated above that straight line. In other words, the $MCS_1$ scheme is determined as that where of the spectral efficiency $v_1$ is highest while satisfying constraint (11).

However, if the strong regime has been selected, this amounts to determining, in the diagram of FIG. 3, the straight line $\Delta_2$ with the highest point of intersection such that the operating point $\Omega$ is situated above that straight line. In other words, the $MCS_1$ scheme is determined as being that where of the spectral efficiency $v_1$ is the highest while satisfying constraint (13).

In step 670, if no $MCS_1$ scheme has been found respecting constraints (11) or (13), according to the selected interference regime, the control node opts for the other interference regime in 675 and the link adaptation method continues in step 650.

Otherwise, the control node indicates the selected MCSs to the concerned transmitting terminals in 680.

In the embodiment above, the interference regime is first selected, and the $MCS_1$, $MCS_2$ schemes maximizing the spectral efficiency while being compatible with the selected regime are then determined. Conversely, it is possible to list the possible $MCS_1$, $MCS_2$ schemes, seek out those among them that are compatible with the selected interference regime, and lastly select the pair of schemes with the highest spectral efficiency.

Furthermore, the embodiment described above uses a selfish strategy inasmuch as the adaptation of the second link aims only to place the first link in the selected interference regime.

In one alternative to this embodiment, the link adaptation method follows a cooperative strategy, i.e., adapts the first and second links jointly, for each pair of interfering communications, so as to place each of them in a selected interference regime.

Figure 7:
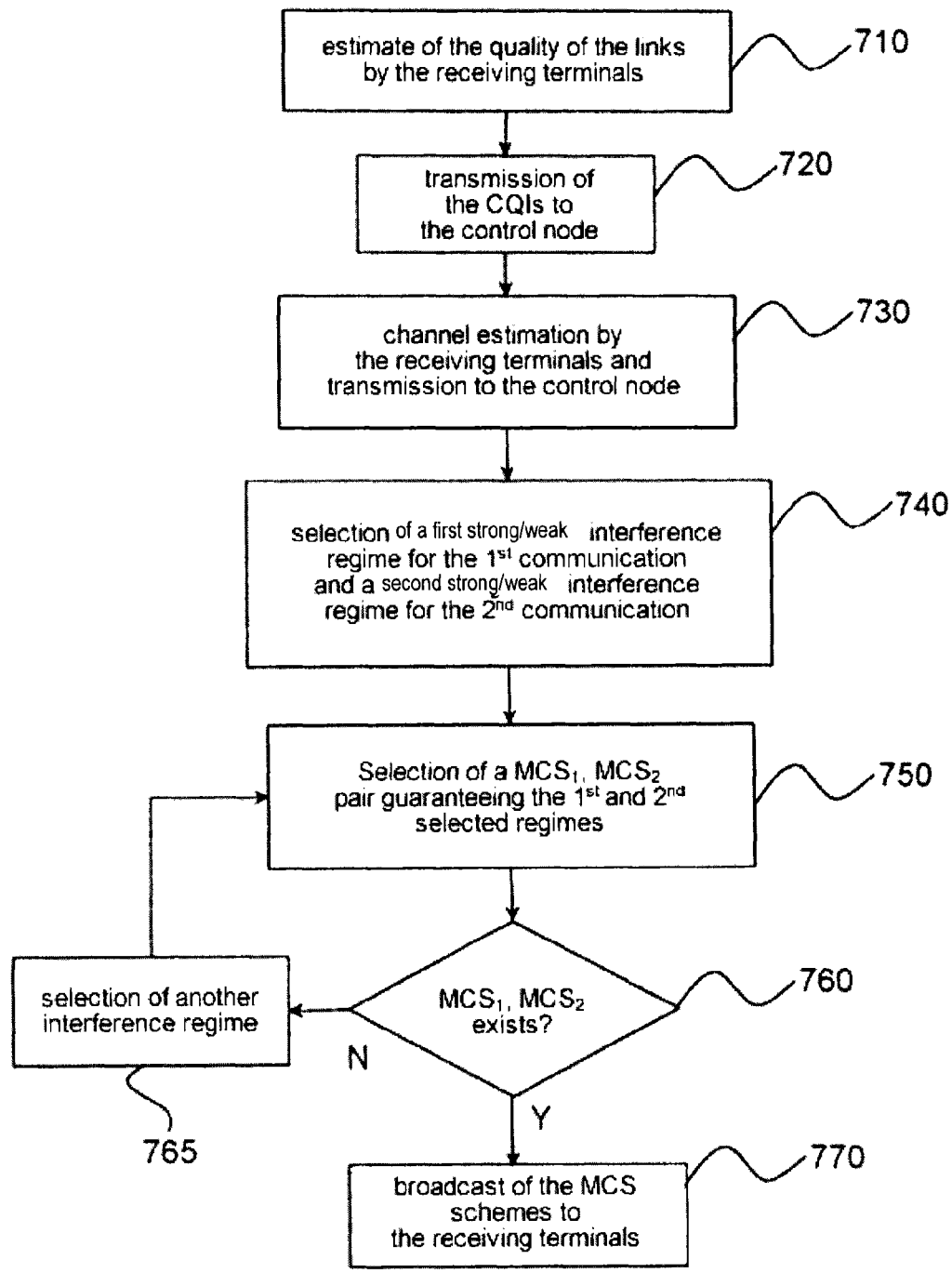
FIG. 7 diagrammatically shows a link adaptation method according to an alternative of the first embodiment.

This cooperative strategy alternative is illustrated in FIG. 7.

Steps 710 to 730 are identical to steps 610 to 630, and will therefore not be described again here.

In step 740, an interference regime for the first communication and an interference regime for the second communication are selected jointly. To that end, in 750, a pair $MCS_1$ and $MCS_2$ is chosen, from among indices below the CQI indices of the first and second links, such that the operating point $\Omega$ belongs to the intersection of the zones relative to the selected regimes for the first and second communications. In other words, the $MCS_2$ scheme is chosen such that the straight line $\Delta^{(1)}$ is situated below or above the operating point, depending on whether the weak or strong regime has been selected for the first communication and the $MCS_1$ scheme is chosen such that the straight line $\Delta^{(2)}$ is situated to the left or right of the operating point, depending on whether the low or strong regime has been chosen for the second communication.

Preferably, the $MCS_1$ and $MCS_2$ pair is chosen verifying the previous condition, such that the spectral densities $v_1$ and $v_2$ are as high as possible.

If such a $MCS_1$,$MCS_2$ pair exists, 760, in 770 the control node indicates the MCSs to the concerned transmitting terminals. Otherwise, in 765, another interference regime is selected for one or the other of the communications, and one returns to step 750.

Figure 8:
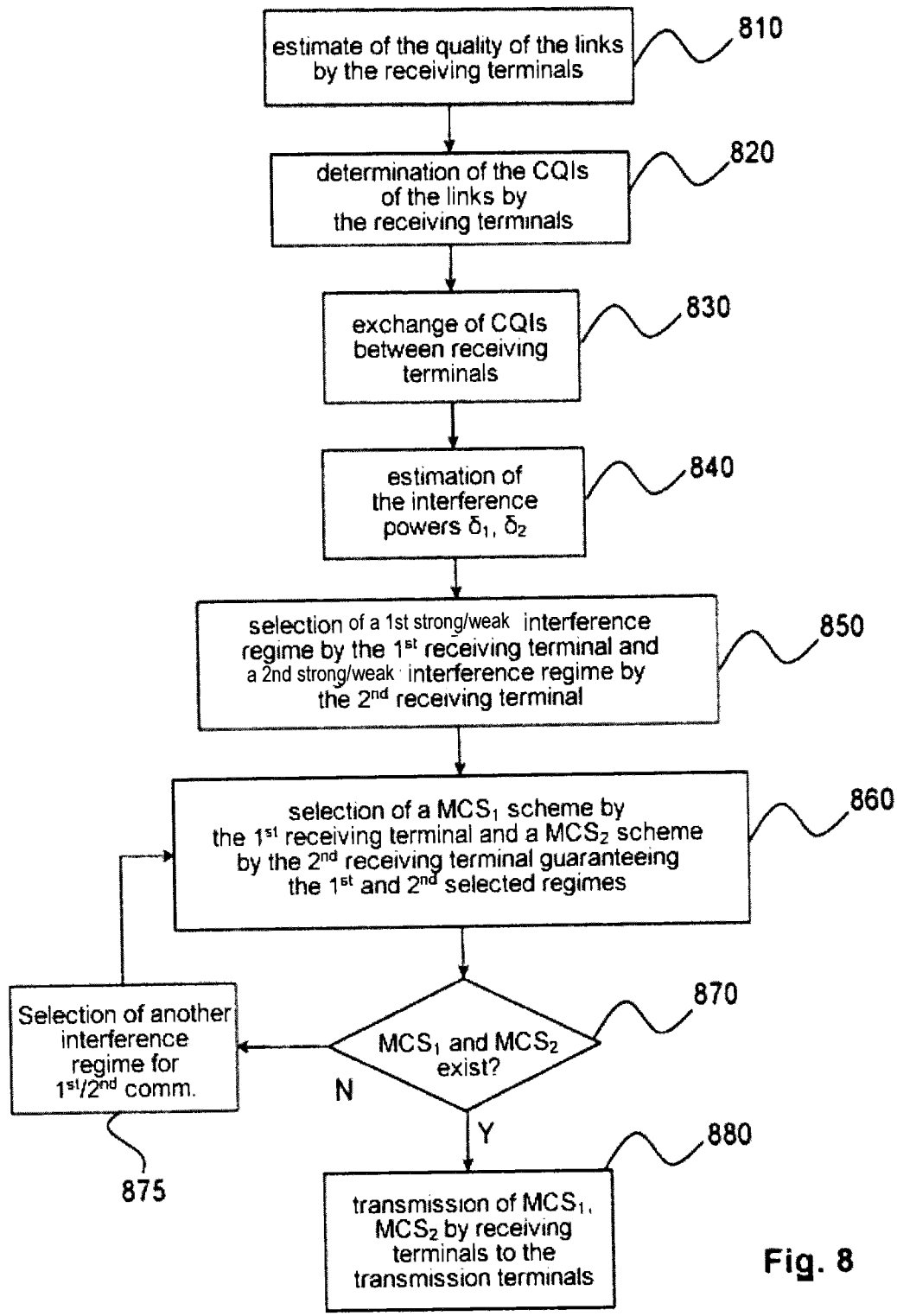
FIG. 8 diagrammatically shows a link adaptation method according to a second embodiment of the invention, of the distributed type.

FIG. 8 diagrammatically shows a link adaptation method according to a second embodiment of the invention. In this second embodiment, the link adaptation is done in a distributed manner within the receiving terminals.

The adaptation method still works on pairs of interfering communications. Hereinafter, we consider a first communication between a first transmitting terminal and a first receiving terminal interfering with a second communication between a second transmitting terminal and a second receiving terminal.

In step 810, the first and second receiving terminals estimate the quality of the first and second links. The link quality may be estimated using a SINR metric or an exp-ESM metric, as previously indicated.

In step 820, each receiving terminal determines the CQI index associated with the link quality measured in the previous step.

In step 830, the receiving terminals exchange the CQI indices. This information may be sent to a node, which then provides it to all of the concerned terminals.

In step 840, each receiving terminal estimates the power of the interference due to the other communication. Thus, the first receiving terminal estimates the power $\delta_1 = f_2 \gamma_2$ and the second receiving terminal estimates the power $\delta_2 = f_1 \gamma_1$. These powers may be determined by difference (between what is perceived by the receiver with and without signal) by providing periods of silence in the transmissions of the first and second transmitting terminals.

In step 850, each receiving terminal determines the interference regime in which it wishes to operate. The interference regime may be chosen based on different criteria, for example battery charge, computation resources of the terminal, power of the interference $\delta_1$, $\delta_2$, respectively, above a certain threshold, power statistics of the interference taken over a longer or shorter time interval.

In step 860, the first receiving terminal determines a $MCS_2$ scheme, with an index above the CQI index of the second link, allowing the first communication to take place in the selected interference regime, in other words, a spectral efficiency scheme $v_2$ verifying $$A_2 \geq \frac{\delta_1 \gamma_1}{1 + \gamma_1}$$

if the weak regime has been selected and such that $$A_2 < \frac{\delta_1 \gamma_1}{1 + \gamma_1}$$

if the strong regime has been selected. Similarly, the second receiving terminal determines a $MCS_1$ scheme, with an index higher than the CQI index of the first link, allowing the second communication to take place in the selected interference regime, in other words, a spectral efficiency scheme $v_1$ verifying $$A_1 \geq \frac{\delta_2 \gamma_2}{1 + \gamma_2}$$

if the weak regime has been selected and such that $$A_1 < \frac{\delta_2 \gamma_2}{1 + \gamma_2}$$

if the strong regime has been selected.

Preferably, the pair $MCS_1$ and $MCS_2$ is chosen verifying the preceding conditions, such that the spectral efficiencies $v_1$ and $v_2$ are as high as possible.

In step 870, the first receiving terminal verifies that such a $MCS_1$ scheme exists and the second receiving terminal verifies that such a $MCS_2$ scheme exists. If this is indeed the case, one continues to step 880. Otherwise, another interference regime is selected for one or the other of the communications.

In step 880, each receiving terminal sends the corresponding transmitting terminal the MCS thus determined.

The invention claimed is:

1. A link adaptation method for a wireless telecommunications system comprising at least one first pair of terminals formed by a first transmitting terminal and a first receiving terminal and a second pair of terminals formed by a second transmitting terminal and a second receiving terminal, a first communication on a first link between the terminals of the first pair using the same transmission resources as a second communication on a second link between the terminals of the second pair, such that the two communications interfere with each other, wherein the method comprises, for the first communication:
  selecting a first interference regime for the first communication from among a weak interference regime, in which the first receiving terminal processes the interference due to the second communication as thermal noise, and a strong interference regime, in which the first receiving terminal decodes the information signal of the second communication to subtract its contribution to the received signal therefrom, the interference regime being selected as a function of a charge level of the battery of the first receiving terminal, the weak interference regime being selected when that level is below a first threshold and the strong interference regime being selected when that level is above a second threshold;
  determining a modulation and coding scheme for the second link allowing the first communication to operate in the interference regime thus selected;
  determining a modulation and coding scheme for the first link maximizing the spectral efficiency without that link being in an outage situation.

2. The link adaptation method according to claim 1, further comprising measuring the quality of each link using a signal-to-noise and interference ratio or using an effective SINR exponential metric, and deducing a quality index of said link.

3. The link adaptation method according to claim 2, wherein to guarantee that a link is not in an outage situation, the modulation and coding scheme is chosen to be below the quality index of the link.

4. The link adaptation method according to claim 1, wherein determining the modulation and coding scheme for the first, second link, respectively, is done in a centralized manner by a control node, said control node indicating the modulation and coding scheme thus determined to the first, second transmitting terminal, respectively.

5. The link adaptation method according to claim 1, wherein determining the modulation and encoding scheme for the first, second link, respectively, is done by the first, second receiving terminal, respectively, and the latter transmitting the modulation and encoding scheme thus determined to the first, second transmitting terminal, respectively.

6. A link adaptation method for a wireless telecommunications system comprising at least one first pair of terminals formed by a first transmitting terminal and a first receiving terminal and a second pair of terminals formed by a second transmitting terminal and a second receiving terminal, a first communication on a first link between the terminals of the first pair using the same transmission resources as a second communication on a second link between the terminals of the second pair, such that the two communications interfere with each other, wherein the method comprises, for the first communication:
  selecting a first interference regime for the first communication from among a weak interference regime, in which the first receiving terminal processes the interference due to the second communication as thermal noise, and a strong interference regime, in which the first receiving terminal decodes the information signal of the second communication to subtract its contribution to the received signal therefrom, the interference regime being selected as a function of the computation resources of the first receiving terminal, the weak interference regime being selected when those resources are below a first threshold and the strong interference regime being selected when those resources are above a second threshold;
  determining a modulation and coding scheme for the second link allowing the first communication to operate in the interference regime thus selected;
  determining a modulation and coding scheme for the first link maximizing the spectral efficiency without that link being in an outage situation.

7. The link adaptation method according to claim 6, further comprising measuring the quality of each link using a signal-to-noise and interference ratio or using an effective SINR exponential metric, and deducing a quality index of said link.

8. The link adaptation method according to claim 7, wherein to guarantee that a link is not in an outage situation, the modulation and coding scheme is chosen to be below the quality index of the link.

* * * * *